(12) United States Patent
Hosny et al.

(10) Patent No.: US 10,482,468 B2
(45) Date of Patent: Nov. 19, 2019

(54) SYSTEMS AND METHODS OF IMPROVED ELECTRONIC MESSAGING

(71) Applicant: MasterCard International Incorporated, Purchase, NY (US)

(72) Inventors: Ahmed Hosny, Dublin (IE); Peter Groarke, Dublin (IE)

(73) Assignee: Mastercard International Incorporated, Purchase, NY (US)

( * ) Notice: Subject to any disclaimer, the term of this patent is extended or adjusted under 35 U.S.C. 154(b) by 408 days.

(21) Appl. No.: 15/349,129

(22) Filed: Nov. 11, 2016

(65) Prior Publication Data

US 2018/0137509 A1    May 17, 2018

(51) Int. Cl.
| | |
|---|---|
| G06Q 20/40 | (2012.01) |
| G06Q 10/08 | (2012.01) |
| G06Q 20/12 | (2012.01) |
| G06Q 30/06 | (2012.01) |
| G06Q 40/08 | (2012.01) |

(52) U.S. Cl.
CPC ......... *G06Q 20/409* (2013.01); *G06Q 10/083* (2013.01); *G06Q 10/0835* (2013.01); *G06Q 20/12* (2013.01); *G06Q 30/0601* (2013.01); *G06Q 40/08* (2013.01)

(58) Field of Classification Search
CPC .... G06Q 20/3674; G06Q 30/06; G06Q 20/12; G06Q 10/083; G06Q 20/4016
See application file for complete search history.

(56) References Cited

U.S. PATENT DOCUMENTS

| 5,659,616 A | 8/1997 | Sudia |
|---|---|---|
| 6,999,943 B1 | 2/2006 | Johnson et al. |

(Continued)

FOREIGN PATENT DOCUMENTS

| WO | 9821678 A1 | 5/1998 |
|---|---|---|
| WO | 0048053 A2 | 8/2000 |

(Continued)

OTHER PUBLICATIONS

PCT International Search Report and Written Opinion, Application No. PCT/US2017/058424, dated Jan. 2, 2018, 13 pps.

*Primary Examiner* — Hao Fu
(74) *Attorney, Agent, or Firm* — Armstrong Teasdale LLP

(57) ABSTRACT

A method of electronic user message protocol extension for a transaction requiring delivery is provided. The method is implemented using a message protocol extension (MPE) computing device. The method comprises receiving, from a merchant computing device, transaction data including a merchant identifier identifying a merchant as a default liable party, receiving, from a delivery computing device, an authorization advice data message including recipient account data for an account of the recipient, extracting an issuer identifier, reallocating transaction liability by replacing the merchant identifier with the issuer identifier in a liable party transaction record, generating an updated authorization advice data message by inserting, into the authorization advice data message, a liability update flag indicating message protocol extension to the issuer, transmitting the updated authorization advice data message to an issuer computing device associated with the issuer, thereby completing message protocol extension for the item from the merchant to the issuer.

20 Claims, 8 Drawing Sheets

(56) References Cited

U.S. PATENT DOCUMENTS

| | | |
|---|---|---|
| 7,849,014 B2 | 12/2010 | Erikson |
| 8,086,493 B2 | 12/2011 | Erikson |
| 8,195,517 B2 | 6/2012 | Erikson |
| 8,676,708 B1 | 3/2014 | Honey |
| 8,756,151 B1 | 6/2014 | Lubling |
| 8,763,916 B1 | 7/2014 | Foo |
| 2002/0022966 A1 | 2/2002 | Horgan |
| 2010/0205078 A1 | 8/2010 | Lawrence |
| 2011/0016513 A1 | 1/2011 | Bailey, Jr. |
| 2011/0071892 A1 | 3/2011 | Dickelman |
| 2011/0191252 A1 | 8/2011 | Dai |
| 2011/0238510 A1 | 9/2011 | Rowen |
| 2012/0221472 A1 | 8/2012 | Erikson |
| 2013/0144785 A1 | 6/2013 | Karpenko |
| 2013/0218765 A1 | 8/2013 | Hammad |
| 2013/0226706 A1 | 8/2013 | Haggerty |
| 2014/0164254 A1 | 6/2014 | Dimmick |
| 2015/0149336 A1 | 5/2015 | Haggerty |
| 2015/0213433 A1 | 7/2015 | Khan |
| 2015/0235209 A1 | 8/2015 | Murphy et al. |
| 2015/0324795 A1* | 11/2015 | Gerber .................. G06Q 20/34 705/44 |

FOREIGN PATENT DOCUMENTS

| | | | |
|---|---|---|---|
| WO | 0055777 A1 | 9/2000 | |
| WO | 02089076 A2 | 11/2002 | |
| WO | WO-02089076 A2 * | 11/2002 | ............. G06Q 20/04 |
| WO | 2013082190 A1 | 6/2013 | |

* cited by examiner

SYSTEMS AND METHODS OF IMPROVED ELECTRONIC MESSAGING

BACKGROUND

This disclosure relates to electronic messaging systems. More specifically, the disclosure relates to improving existing messaging systems in a networked environment in order to re-associate certain data parameters to a party that is different from a default party.

As a matter of background, electronic messaging networks use a variety of different message types for various purposes. Different message types may be assigned message identifiers to distinguish them from each other. Messages exchanged over electronic financial messaging networks may use a messaging standard. During normal processing, message identifiers can be used as a signifier of the message content. For example, the ISO 8583 messaging protocol uses message type indicators (MTIs) to designate different message types and reference the content or purpose of the message. During a financial transaction, messages are exchanged between a variety of computing devices. A financial transaction message includes data such as data regarding a party that has liability for the transaction (e.g., for loss of the money or credit exchanged, or for loss or damage to the goods or services purchased).

The risks involved in online transactions often differ in important ways from those involved in merchant location transactions. Goods purchased online are delivered (e.g., by a postal or delivery service) to a destination of the accountholder's choosing. This destination may be, for example, the accountholder's residence or place of work. The destination may not be a secure location. The accountholder may not be continuously present at the destination and/or others may be present. The delivered goods may be misplaced, mishandled, or stolen. Additionally, an unauthorized user may use the accountholder's account data to initiate a transaction and get the goods delivered to the unauthorized user's preferred destination.

Some known systems are limited in that they are unable to use electronic messaging to verify that a delivery recipient was authorized. Additionally, some known systems address fraud issues in chargeback transactions by generating authentication values prior to the authorization for the transaction. In such systems, the authentication value needs to be generated before authorization, sent by the merchant, approved by the issuer, and only then will liability shift from the merchant to the issuer. Such systems are costly to implement and are unable to leverage existing infrastructure.

BRIEF DESCRIPTION

In one aspect, a method of electronic user message protocol extension for a transaction of an accountholder with a merchant is provided. The method is implemented using a message protocol extension (MPE) computing device in communication with a memory device. The method comprises receiving, from a merchant computing device associated with the merchant, transaction data including a merchant identifier that identifies the merchant as a default liable party for the transaction, wherein the accountholder requests delivery of an item associated with the transaction. The method also comprises receiving, from a delivery party point of delivery (POD) computing device upon delivery of the item, an authorization advice data message that includes recipient account data associated with an account issued by an issuer for the recipient. The method further comprises extracting, from the recipient account data, an issuer identifier associated with the issuer. The method also comprises reallocating liability for the transaction by replacing the merchant identifier with the issuer identifier in a first liable party data record for the transaction stored within the memory device. The method further comprises generating an updated authorization advice data message by inserting, into the authorization advice data message, a liability update flag that indicates message protocol extension to the issuer. The method also comprises transmitting the updated authorization advice data message to an issuer computing device associated with the issuer, thereby completing message protocol extension for the item from the merchant to the issuer.

In another aspect, a system for electronic user message protocol extension for a transaction of an accountholder with a merchant is provided. The system comprises a memory device configured to store account data and a message protocol extension (MPE) computing device in communication with the memory device. The MPE computing device is configured to receive, from a merchant computing device associated with the merchant, transaction data including a merchant identifier that identifies the merchant as a default liable party for the transaction, wherein the accountholder requests delivery of an item associated with the transaction. The MPE computing device is also configured to receive, from a delivery party point of delivery (POD) computing device upon delivery of the item, an authorization advice data message that includes recipient account data associated with an account issued by an issuer for the recipient. The MPE computing device is further configured to extract, from the recipient account data, an issuer identifier associated with the issuer. The MPE computing device is also configured to reallocate liability for the transaction by replacing the merchant identifier with the issuer identifier in a first liable party data record for the transaction stored within the memory device. The MPE computing device is further configured to generate an updated authorization advice data message by inserting, into the authorization advice data message, a liability update flag that indicates message protocol extension to the issuer. The MPE computing device is also configured to transmit the updated authorization advice data message to an issuer computing device associated with the issuer, thereby completing message protocol extension for the item from the merchant to the issuer.

In yet another aspect, a non-transitory computer readable medium that includes computer executable instructions for electronic user message protocol extension for a transaction of an accountholder with a merchant is provided. When executed by a message protocol extension (MPE) computing device comprising a processor in communication with a memory device, the computer executable instructions cause the MPE computing device to receive, from a merchant computing device associated with the merchant, transaction data including a merchant identifier that identifies the merchant as a default liable party for the transaction, wherein the accountholder requests delivery of an item associated with the transaction. The computer executable instructions also cause the MPE computing device to receive, from a delivery party point of delivery (POD) computing device upon delivery of the item, an authorization advice data message that includes recipient account data associated with an account issued by an issuer for the recipient. The computer executable instructions further cause the MPE computing device to extract, from the recipient account data, an issuer identifier associated with the issuer. The computer executable instructions also cause the MPE computing device to reallocate liability for the transaction by replacing the merchant identifier with the issuer identifier in a first liable party data record for the transaction stored within the memory device. The computer executable instructions further cause the MPE computing device to generate an updated authorization advice data message by inserting, into the authorization advice data message, a liability update flag that indicates message protocol extension to the issuer. The computer executable instructions also cause the MPE computing device to transmit the updated authorization advice data message to an issuer computing device associated with the issuer, thereby completing message protocol extension for the item from the merchant to the issuer.

BRIEF DESCRIPTION OF THE DRAWINGS

FIG. 1 is a schematic diagram illustrating an example message protocol extension platform for payment card transactions prior to authorization.

FIG. 2 is a block diagram of an example message protocol extension computing system, in which a variety of computing devices are communicatively coupled to each other via a plurality of network connections.

FIG. 3 illustrates an expanded block diagram of an example embodiment of server architecture of a message protocol extension (MPE) computer system including other computer devices.

FIG. 4 illustrates an example configuration of a user system, such as an accountholder computer device configured to transmit account data.

FIG. 5 shows an example configuration of a server device, such as an MPE computing device configured for message protocol extension for a transaction.

FIG. 6 shows an example message flow illustrating how the MPE computing device reallocates liability for a transaction.

FIG. 7 shows an example method flow illustrating how the MPE computing device reallocates liability for a transaction.

FIG. 8 shows an example configuration of a database within a computing device, along with other related computing components, that may be used to reallocate liability for a transaction.

Like numbers in the Figures indicate the same or functionally similar components.

DETAILED DESCRIPTION

Figure 1:
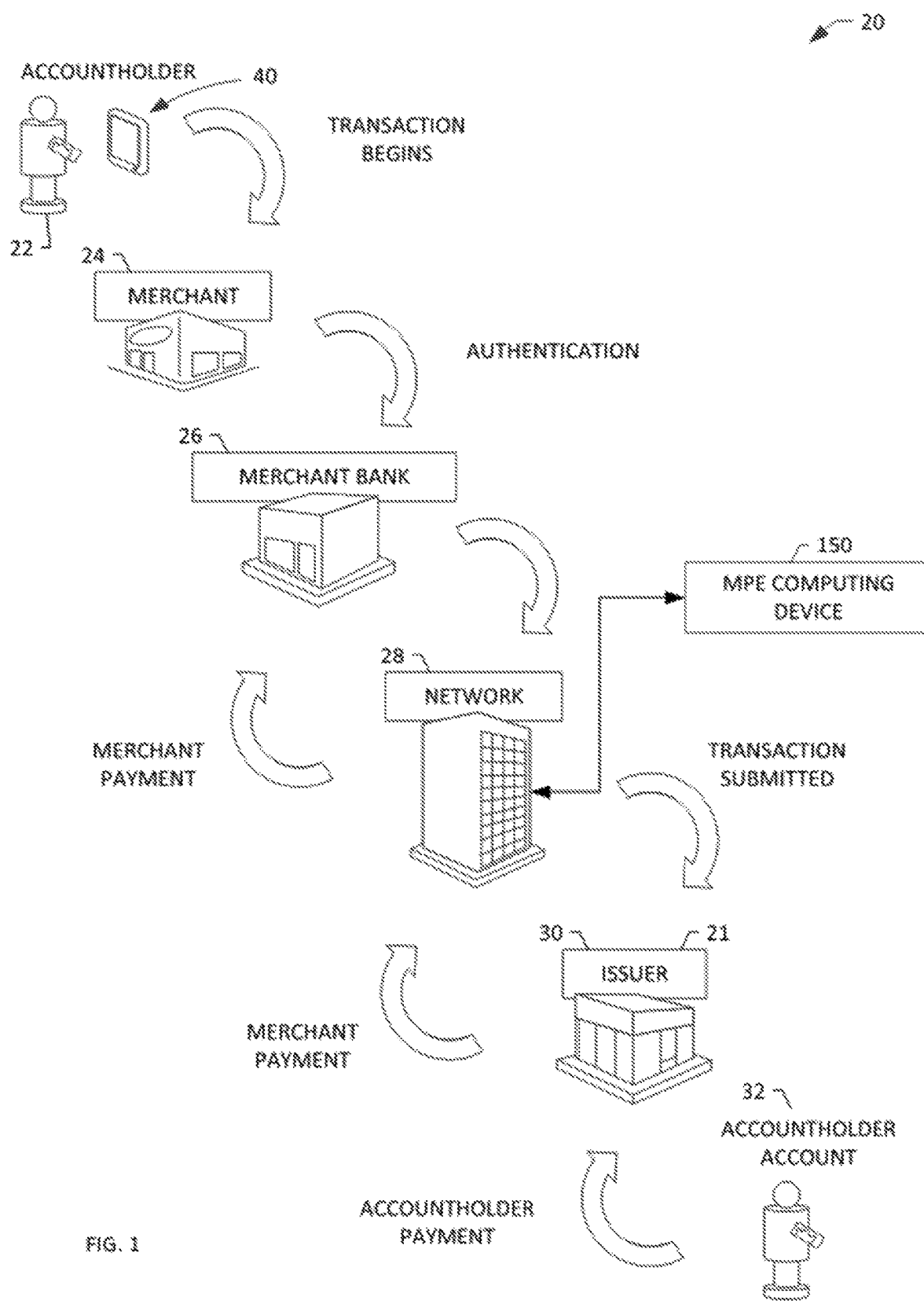
FIGS. 1-8 show example embodiments of the methods and systems described herein.

The present disclosure relates to a message protocol extension (MPE) computing device. The MPE computing device is configured to extend the use of certain message types into new use cases in order to generate useful data for computing devices that receive messages of those types. More specifically, the MPE computing device repurposes certain financial messages in order to determine a financial liability or responsibility for a transaction. In at least some implementations, the MPE computing device is part of a larger MPE computing system. The MPE computing system includes a point of delivery (POD) computing device that transmits an authorization advice data message to the MPE computing device. The POD computing device is configured to transmit authorization advice data messages that have been enhanced in specific ways. The MPE computing device in turn repurposes the authorization advice data message to act as a notification that liability has shifted from one party to another party.

In at least some implementations, the MPE computing device acts to extend an existing message protocol. In particular, the ISO 8583 messaging protocol includes a number of message types, each with its own defined function. For example, a 0100 message (i.e. a message whose message type indicator is 0100) represents an authorization request from a point-of-sale device for authorization for a cardholder purchase. A 0110 message represents a response to a point-of-sale device for authorization for a cardholder purchase. Similarly, a 0120 message represents authorization advice (e.g., advice that, for example, a point of sale device is inoperative, or another error occurred that prevents the transaction from being completed).

In one embodiment, the MPE computing device is configured to extend the usage of the 0120 authorization advice data message within the ISO 8583 protocol in several distinct ways. For example, the MPE computing device configures another device (e.g., a point of delivery device as described in more detail below) to send the 0120 authorization advice data message when an item is delivered to a recipient. Additionally, the 0120 authorization advice data message is reprocessed by the MPE computing device to generate an updated authorization advice data message that notifies another computing device (e.g., an issuer computing device) of changes to transmitted message data. In one embodiment, the MPE computing device reconfigures the 0120 authorization advice data message to notify an issuer that liability for a delivered item has now been reallocated to the issuer (instead of another party, e.g., a merchant).

Moreover, the MPE computing device transmits specific configuration instructions to POD computing devices so that the POD computing devices transmit enhanced authorization advice data messages. In one embodiment, these configuration instructions direct the POD computing device to augment an authorization advice data message with specific data points. For example, the MPE computing device configures the POD computing device to transmit an authorization advice data message that includes a data element referencing a particular bank, banking computer device, or banking network. As another example, the MPE computing device configures the POD computing device to transmit an authorization advice data message that includes a data element combination (e.g., PAN, date, time, and authorization code). These message enhancements become additionally useful when the MPE computing device associates authorization advice data messages with the original transaction data message.

In at least some implementations, the MPE computing device is configured to receive transaction data for transactions between accountholders and merchants. As used herein, accountholder refers to any individual that uses a financial account issued by an issuing bank for payment transactions. The accountholder will initiate transactions using a physical payment card and/or electronically (e.g., by providing account data at a website). For example, an accountholder will initiate a transaction with a merchant at a physical location (e.g., a merchant store, kiosk, or the like). As another example, an accountholder will initiate a transaction electronically (e.g., at a merchant website, computer application, or the like).

Whether the transaction is performed at a physical location or electronically, the transaction will frequently include an order to deliver the item to a location specified by the accountholder (also referred to herein as the "delivery location"). For example, the accountholder may visit a furniture store and request delivery of a table to the delivery location (which may be the accountholder's home, for example). Similarly, the accountholder may visit the furniture store's website, purchase the table, and order that the table be delivered to the delivery location. The transaction, whether in person or online, generates transaction data that is received by the MPE computing device. In one embodiment, the transaction data received by the MPE computing device includes data indicating that the purchased item is to be delivered from the merchant to the delivery location.

If the item is lost or damaged during delivery from the merchant to the accountholder, the merchant will incur liability. For example, the merchant will need to refund an amount of funds equal to the transaction amount back to the accountholder, because the accountholder paid for but did not receive the item. In at least some implementations, liability for loss of or damage to the item is allocated to the merchant by default. In other implementations, the merchant is allocated this liability each time a transaction is initiated. More specifically, a liable party data record is stored or transmitted with the transaction data for each transaction. As used herein, a liable party data record is electronically stored computer data that is populated with a value for the liable party (e.g., a merchant name or other identifier). As described above, the liable party data record may be populated with the merchant name by default.

In at least some implementations, the merchant delivers the purchased item itself (e.g., through using the merchant's own delivery vehicle). However, in other implementations, the merchant directs a delivery party to actually transport the item to the accountholder. In other words, the item may be delivered by a delivery party that is distinct from the merchant. For example, an online furniture merchant will receive an order to deliver a table to an accountholder and will subsequently prepare the table for delivery. Preparing the delivery includes contacting a delivery party (e.g., a government postal service, courier service, or the like) and providing delivery data (e.g., delivery date/time, special instructions regarding safety of the item, or the like). In at least some implementations, the merchant provides accountholder information (e.g., account data as described above, accountholder address, and other accountholder identifiers) to the delivery party for use in delivering the item. Accordingly, the delivery party has the ability to verify the accountholder's information upon delivery of the item.

In at least some implementations, when the delivery party delivers the item, the delivery party requires account data from a recipient of the item. Using the abovementioned example, when the delivery party delivers the table, the delivery party may ask the recipient of the table to provide account data for an account the recipient has with an issuing bank (also referred to herein as recipient account data). As noted above, the recipient may be the accountholder that purchased the table (also referred to herein as the transacting accountholder), or it may be another individual. Such individuals that did not initiate the transaction for the item but are present to receive the item at the delivery location are also referred to herein as non-transacting accountholders. This term is used because these individuals are contemplated as having financial accounts of their own as issued by an issued bank. Accordingly, non-transacting accountholders have the ability to provide account data if requested.

In at least some implementations, the delivery party presents a delivery party point of delivery (POD) computing device during the delivery process. The POD computing device is configured to receive account data from the recipient (e.g., the transacting accountholder or any non-transacting accountholder). In one embodiment, a delivery agent (e.g., a postal worker or courier employee) will, on delivery, ask the recipient to present the recipient's account data (or recipient account data). The recipient can provide account data using a physical payment card (e.g., by swiping, tapping, or otherwise causing the payment card to interact with the POD computing device). The recipient can also provide account data via a recipient computing device.

In at least some implementations, the POD computing device, at delivery time, transmits an account data request message to a recipient computing device. The recipient computing device receives the account data request message and provides an account data response message bearing recipient account data for the recipient's account. Recipient account data, similar to account data for the transacting accountholder, includes data such as account identifiers, a primary account number (PAN), accountholder identifiers, issuer identifiers, or the like.

Transmissions between the POD computing device and the recipient computing device can take the form of short message service (SMS) messages, Bluetooth® communication, or the like. (BLUETOOTH is a registered trademark of the Bluetooth Special Interest Group, headquartered in Kirkland, Wash., United States). The POD computing device may request account data by sending a message through a computer application of the recipient (e.g., an electronic wallet application). Particularly where the recipient is the transacting accountholder, the recipient may have a record of the transaction to purchase the item and may confirm receipt through a computer application associated with the merchant and/or issuing bank. Communication may be through a wired connection established between the two computing devices. In other embodiments, the POD computing device displays an electronic code or image that can be scanned by the recipient computing device in order to establish a connection and/or transmit account data from the recipient computing device.

When the recipient provides recipient account data for the recipient's account, the POD computing device is configured to generate an authorization advice data message. The authorization advice data message includes transaction data from the original transaction, as well as recipient account data received from the account data response message received from the recipient. In one embodiment, the merchant retains all or part of the transaction data generated during the transaction to purchase the item. The merchant may download the retained transaction data to the POD computing device or the POD computing device may retrieve the retained transaction data at delivery time. As a result, the authorization advice data message includes account data from the transacting accountholder as well as recipient account data from the recipient. These may be similar, where the transacting accountholder and recipient own the same financial account or are the same person. These data may be different where the transacting accountholder and recipient control different accounts. Additionally, the issuer identifier included within each set of account data may be the same (same account at the same bank or different accounts but at the same bank). Or the issuer identifier may be different (different accounts at different banks).

The authorization advice data message is transmitted to the MPE computing device via a transaction message channel (i.e., a communication path used to transmit and receive transaction data for electronic payment transactions). More specifically, the authorization advice data message includes a message identifier denoting that the message is an authorization advice data message (as opposed to a transaction data message). In one embodiment, the authorization advice data message includes a message identifier of 0120, whereas a transaction data message includes a message identifier other than 0120 (e.g., 0110).

The MPE computing device is configured to receive, from the POD computing device, the authorization advice data message. In one embodiment, the MPE computing device is configured to interpret any authorization advice data message as including recipient account data. In other words, any message labeled with the 0120 identifier is interpreted as including recipient account data and routed accordingly. In another embodiment, the MPE computing device filters every incoming message based on message identifier. When messages labeled with 0120 are located, the MPE computing device determines that it is an authorization advice data message.

Additionally, the MPE computing device is configured to electronically associate the authorization advice data message with transaction data for the original transaction. In the exemplary embodiment, the MPE computing device identifies data elements that are present in both the authorization advice data message and the previously received transaction data. As noted earlier, these data elements form message enhancements that were previously electronically inserted by the POD computing device using configuration instructions provided by the MPE computing device. The identified common data elements are used to create associations between the authorization advice data message and the transaction data (e.g., by using the common data element as a foreign key in a database).

As noted above, the authorization advice data message will include two sets of account data, for the transacting accountholder and the recipient respectively. The MPE computing device is configured to extract each of these sets of account data. In one embodiment, the MPE computing device parses the authorization advice data message for account data (e.g., specific identifiers). Account data may be closely interwoven with other data such as transaction data or other payment processing network data. The MPE computing device detects account data and, more specifically, isolates the issuer identifier for the issuer of the recipient (or recipient issuer).

The MPE computing device is configured to access a memory device that stores transaction data for the transaction. The MPE computing device is configured to reallocate liability for the transaction by replacing a merchant identifier with the issuer identifier in a liable party data record stored within the memory device, wherein the liable party data record corresponds to the transaction. As earlier defined, a liable party data record may be populated with the merchant name or other identifier by default. Accordingly, the MPE computing device replaces the merchant identifier with the issuer identifier for the recipient issuer. The MPE computing device is further configured to transmit an updated authorization advice data message (including a liability update flag) to an issuer computing device associated with the recipient issuer. Notably, the recipient issuer may be the same issuer as that for the transacting accountholder. This transmission indicates a shift of liability for the item from the merchant to the recipient issuer.

In at least some implementations, the MPE computing device shifts liability completely from the merchant to the issuer. In other words, the issuer is allocated liability for the full value of the transaction. In other implementations, the initial transaction may require multiple deliveries of items. Multiple deliveries may result in multiple authorization advice data messages for one initial transaction (i.e., each time a delivery is made, the POD computing device at the time of delivery generates a separate authorization advice data message). Partial delivery of items may mean that some items have been delivered to a recipient or recipients, but that other items are still at the merchant location, awaiting delivery.

Accordingly, the MPE computing device is configured to shift liability from the merchant to the recipient issuer on a per-delivery basis. The MPE computing device shifts liability each time an authorization advice data message is received from a POD computing device. In one embodiment, the MPE computing device shifts liability equal to a transaction amount for the delivered item. For example, assume the total transaction amount was $100 for two items each worth $50. Each item is delivered on different days. The MPE computing device is configured to shift liability by $50 when the first item is delivered, and shift liability by $50 once the other item is delivered.

More specifically, the MPE computing device determines the transaction amount for the item delivered by analyzing the authorization advice data message. The authorization advice data message includes a transaction amount for the item delivered. The MPE computing device receives transaction data for the item delivered and shifts liability accordingly. In one embodiment, the MPE computing device also tracks whether the delivery was a partial delivery or a complete delivery. Additionally, the MPE computing device generates additional liability identifiers and populates these with relevant data, especially in the case of partial deliveries. The MPE computing device determines the transaction amount for the item delivered, compares it to the total transaction amount, and determines that a partial delivery was made. In other words, items of the transaction are still to be delivered (i.e., the merchant should retain liability for the undelivered items).

Accordingly, the MPE computing device generates one or more additional liable party data records. For example, the MPE computing device generates an additional liable party data record for a total of two (including the existing liable party data record stored in the memory device). The MPE computing device populates one liable party data record with the merchant identifier and the other liable party data record with the recipient issuer identifier. Additionally, the MPE computing device may generate additional variables or data structures to store additional data. For example, in addition to storing identifiers for the liable party, the MPE computing device may also separately store the transaction amount for which each party is liable. The MPE computing device may also separately identify the item associated with each liable party's liability, delivery data (e.g., delivery date/time), or the like.

In a related embodiment, the MPE computing device implements specific liability rules that automatically assign or reassign liability based on certain conditions. For example, consider a scenario where the transacting accountholder is also the recipient. Accordingly the 0120 authorization advice data message provides the issuer identifier for the transacting accountholder and the MPE computing device allocates liability to the relevant issuer. However, the recipient may wish to return the delivered item. In case of a return, liability for loss or damage to the returned item ought to be reallocated back to the merchant that is accepting a return of the item. Accordingly, the MPE computing device is configured to implement, for example, a liability rule to automatically reallocate liability to the merchant.

Additional liability rules may include a rule to allocate liability for the complete transaction to the recipient issuer even if only partial delivery has been made. Liability rules may similar include a rule to keep liability with the merchant until all items have been delivered and act to reallocate liability to the recipient issuer only when the last authorization advice data message has been received (i.e., the last item has been delivered).

The technical problems addressed by this system include at least one of: (i) inaccurate liability data issues caused when items are lost, stolen, or damaged after delivery yet merchants are still held liable, (ii) lack of tracking data relating to recipients of delivered items, and (iii) wasted computer processing and network traffic generated as a result of inaccurate data and manual interventions required to correct liability data.

The methods and systems described herein may be implemented using computer programming or engineering techniques including computer software, firmware, hardware, or any combination or subset thereof, wherein the technical effects may be achieved by i) TBD.

The resulting technical benefits achieved by this system include at least one of: (i) new and improved usage of authorization advice data messages, (ii) improved electronic transaction processing involving fewer inaccurate data records, especially those relating to liability, thereby leading to decreases in unnecessary network traffic and computer processing, (iii) generation of useful data for issuer computing devices and merchant computing devices, where issuers and merchants can better predict fraudulent activity by more accurately identifying non-fraudulent accountholder activity, and (iv) ability of issuers and merchants to accurately determine liability for an item without the need for additional computer infrastructure.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example message protocol extension platform for payment card transactions prior to authorization. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.). Embodiments described herein also relate to a message protocol extension (MPE) computing device 150 that is communicatively coupled to an interchange network computing device 28. The MPE computing device 150 is configured to receive transaction data from interchange network computing device 28 and reallocate liability for a transaction.

In the exemplary message protocol extension platform, a financial institution called the "issuer" issues an account, such as a credit card account, to the accountholder or accountholder 22, who uses the account to tender payment for a purchase from a merchant 24. In one embodiment, the accountholder presents a physical payment card to merchant 24 (also known as a card-present transaction). In another embodiment, the accountholder does not present a physical payment card and instead performs a card-not-present transaction. For example, the card-not-present transaction may be initiated via an electronic wallet application, through a website or web portal, via telephone, or any other method that does not require the accountholder to present a physical payment card to merchant 24 (e.g., via swiping or tapping the card).

To accept payment with the transaction card, merchant 24 establishes an account with a financial institution that is part of the financial payment system. This financial institution is usually called the "merchant bank," the "acquiring bank," or the "acquirer." In one embodiment, accountholder 22 tenders payment for a purchase using a transaction card at a transaction processing device 40 (e.g., a point of sale device), then merchant 24 requests authorization from a merchant bank 26 for the amount of the purchase. The request is usually performed through the use of a point-of-sale terminal, which reads accountholder 22's account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether accountholder 22's account 32 is in good standing and whether the purchase is covered by accountholder 22's available credit line. Based on these determinations, the request for authorization will be declined or accepted. If the request is accepted, an authorization code is issued to merchant 24.

When a request for authorization is accepted, the available credit line of accountholder 22's account 32 is decreased. Normally, a charge for a payment card transaction is not posted immediately to accountholder 22's account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If accountholder 22 cancels a transaction before it is captured, a "void" is generated. If accountholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, accountholder account information, a type of transaction, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant 24's account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described above, the various parties to the payment card transaction include one or more of the parties shown in FIG. 1 such as, for example, accountholder 22, merchant 24, merchant bank 26, interchange network 28 (also referred to herein as payment processor 28), issuer bank 30, and/or an issuer processor 21.

Figure 2:
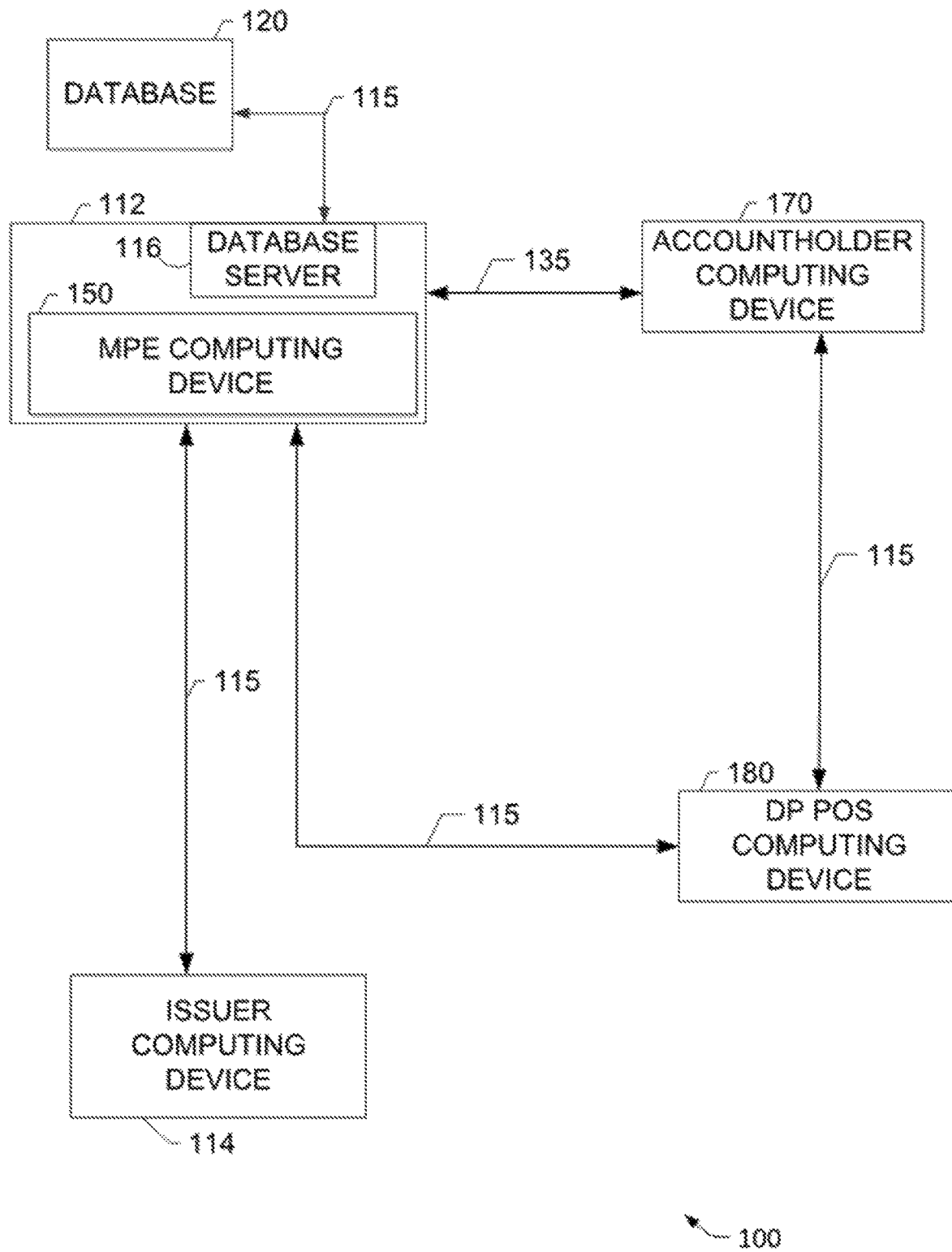

FIG. 2 is a block diagram of an example message protocol extension computing system, in which a variety of computing devices are communicatively coupled to each other via a plurality of network connections. These network connections may be Internet, LAN/WAN, or other connections capable of transmitting data across computing devices. Environment 100 shows message protocol extension (MPE) computing device 150 and a database server 116. In one embodiment, MPE computing device 150 and database server 116 are components of a message protocol extension (MPE) system 112. Server system 112 may be a server, a network of multiple computer devices, a virtual computing device, or the like. MPE computing device 150 is connected to at least one accountholder computing device 170, a merchant computing device 180, and an issuer computing device 114 via at least a network connection 115 and network connection 115.

In one embodiment, MPE computing device 150 is configured to receive transaction data from merchant computing device 180, over a network connection 115. As noted with respect to FIG. 1, when an accountholder performs a transaction at a merchant location, transaction data is generated. Transaction data may be transmitted across computer devices as a transaction data message. In one embodiment, when an accountholder performs a transaction at merchant computing device 180 associated with a merchant, transaction data for the transaction is transmitted to server system 112. Server system 112 processes the transaction data in the manner described with respect to FIG. 1 and also provides it to MPE computing device 150. MPE computing device 150 is also configured to communicate with accountholder computing device 170 via an electronic communication channel or method that is distinct from one used to communicate transaction data. In the example embodiment, MPE computing device 150 is configured to communicate with accountholder computing device 170 via electronic communication channel 135.

The transaction data message may also include a transaction amount, a transaction date, account data related to the payment card used to perform the transaction (e.g., primary account number (PAN) associated with payment card, card expiration date, card issuer, card security code, or the like), a merchant identifier, stock-keeping unit (SKU) data relating to the goods or services purchased from the accountholder, or the like. In one embodiment, MPE computing device 150 parses the complete transaction data file searching for, filtering, or otherwise extracting account data. For example, MPE computing device 150 may determine after parsing the complete transaction data file that it contains an issuer identifier for the accountholder.

Database server 116 is connected to database 120, which contains information on a variety of matters, as described below in greater detail. In one embodiment, database 120 is stored on server system 112 and can be accessed by potential users of server system 112. In an alternative embodiment, database 120 is stored remotely from server system 112 and may be non-centralized. Database 120 may include a single database having separated sections or partitions or may include multiple databases, each being separate from each other. Database 120 may store account data for each accountholder in communication with MPE computing device 150.

In the example embodiment, MPE computing device 150 includes specifically designed computer hardware to perform the steps described herein, and includes specifically designed computer implementation instructions. MPE computing device 150 is a specially designed and customized computer device built to perform the specific function of reallocating liability for a transaction by receiving account data from accountholders, processing those inputs to isolate issuer identifiers, and generating outputs (e.g., updated authorization advice data messages) that are transmitted to other computing devices (e.g., issuer computing devices).

Figure 3:
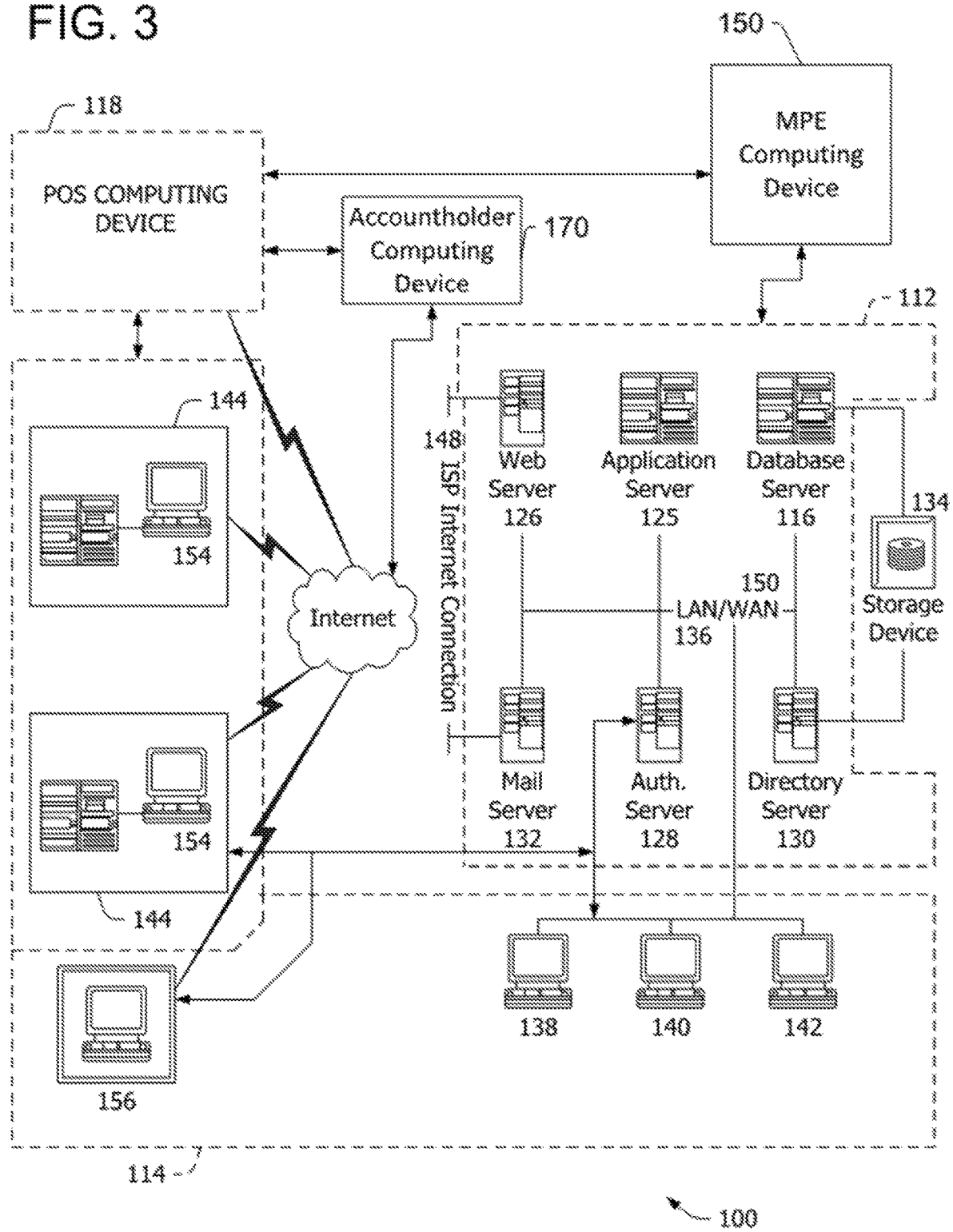

FIG. 3 is an expanded block diagram of an example embodiment of server architecture of a message protocol extension (MPE) computer system including other computer devices in accordance with one embodiment of the present disclosure. Components in MPE computer system 100, identical to components of environment 100 (shown in FIG. 2), are identified in FIG. 3 using the same reference numerals as used in FIG. 2. MPE computer system 100 includes server system 112 (similar to MPE computing device 150, shown in FIG. 2. Server system 112 further includes database server 116, a web server 126, a user authentication system 106, and an application server 125. A storage device 134 is coupled to database server 116. Servers 116, 124, 126, 128, 130, and 132 are coupled in a local area network (LAN) 136. In addition, an issuer bank workstation 138 (similar to issuer computing device 114 shown in FIG. 2), acquirer bank workstation 140, and a third party processor workstation 142 may be coupled to LAN 136.

In the example embodiment, issuer bank workstation 138, acquirer bank workstation 140, and third party processor workstation 142 are coupled to LAN 136 using network 115. Workstations 138, 140, and 142 are coupled to LAN 136 using an Internet link or are connected through an Intranet. In the example embodiment, MPE computing device 150 is in communication with issuer bank workstation 138 and delivery party point of delivery (POD) computing device 118. Accountholder computer device 170 is also connected to the Internet and may be a smartphone, personal computer, tablet computer, or similar computing device. MPE computing device 150 is configured to receive authorization advice data messages via server system 112, process account data and transmit it to issuer bank workstation 138.

Each workstation 138, 140, and 142 is a computer with Internet access. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees and third parties 144 (e.g., account holders, customers, auditors, developers, accountholders, merchants, acquirers, issuers, etc.), using an ISP Internet connection 148. The communication in the example embodiment is illustrated as being performed using the Internet. However, any other wide area network (WAN) type communication can be utilized in other embodiments. In other words, the systems and processes are not limited to being practiced using the Internet.

In the example embodiment, any authorized individual having a workstation 154 can access MPE computer system 100. At least one of the client systems includes a manager workstation 156 located at a remote location. Workstations 154 and 156 are personal computers having a web browser. Also, workstations 154 and 156 are configured to communicate with server system 112. Furthermore, authentication server 128 communicates with remotely located client systems, including a client system 156 using a telephone link. Authentication server 128 is configured to communicate with other client workstations 138, 140, and 142 as well.

Figure 4:
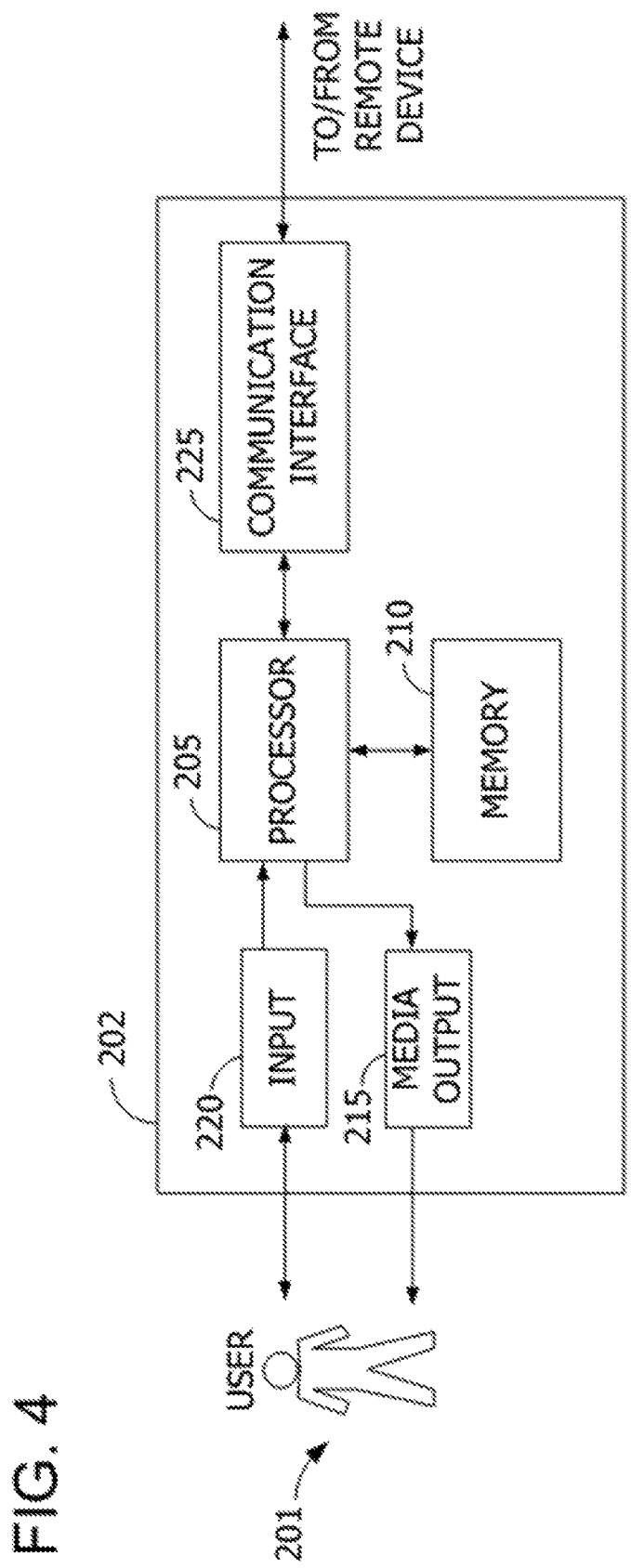

FIG. 4 illustrates an example configuration of a user system, such as an accountholder computer device configured to transmit data to the MPE computing device. User system 202 may include, but is not limited to, accountholder computing device 170. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. For example, media output component 215 may be a display component configured to display component lifecycle data in the form of reports, dashboards, communications, or the like. In some embodiments, media output component 215 includes an output adapter such as a video adapter and/or an audio adapter. An output adapter is operatively coupled to processor 205 and operatively connectable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively connectable to a remote device such as Server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
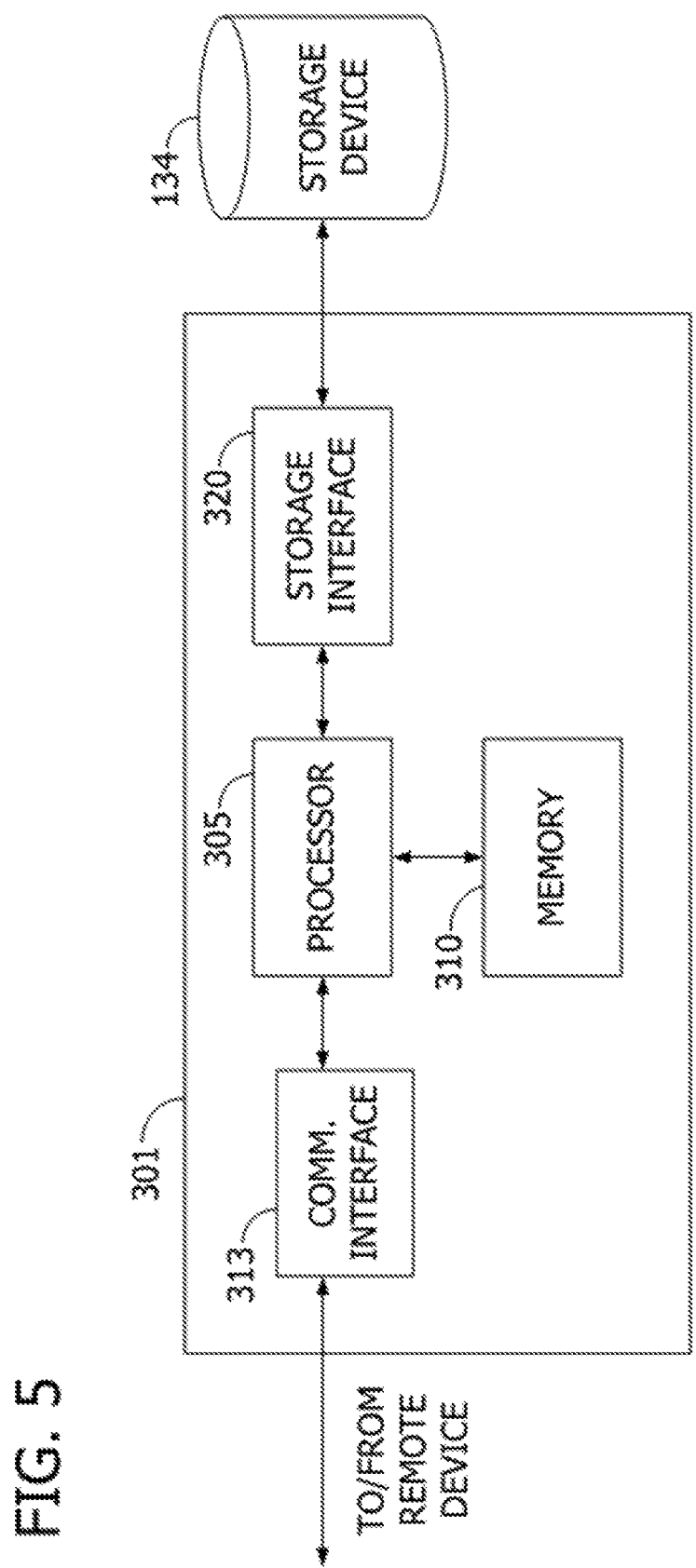

FIG. 5 illustrates an example configuration of a server system 301 such as the server system 112 shown in FIG. 2 that includes MPE computing device 150. Server system 301 may include, but is not limited to, database server 116 or MPE computing device 150 (shown in FIG. 2). In some embodiments, server system 301 is similar to server system 112 (shown in FIG. 2).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. More specifically, the instructions may cause various data manipulations on data stored in storage 134 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive communications from issuer computing devices 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. In other embodiments, storage device 134 is external to server system 301 and is similar to database 120 (shown in FIG. 2). For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
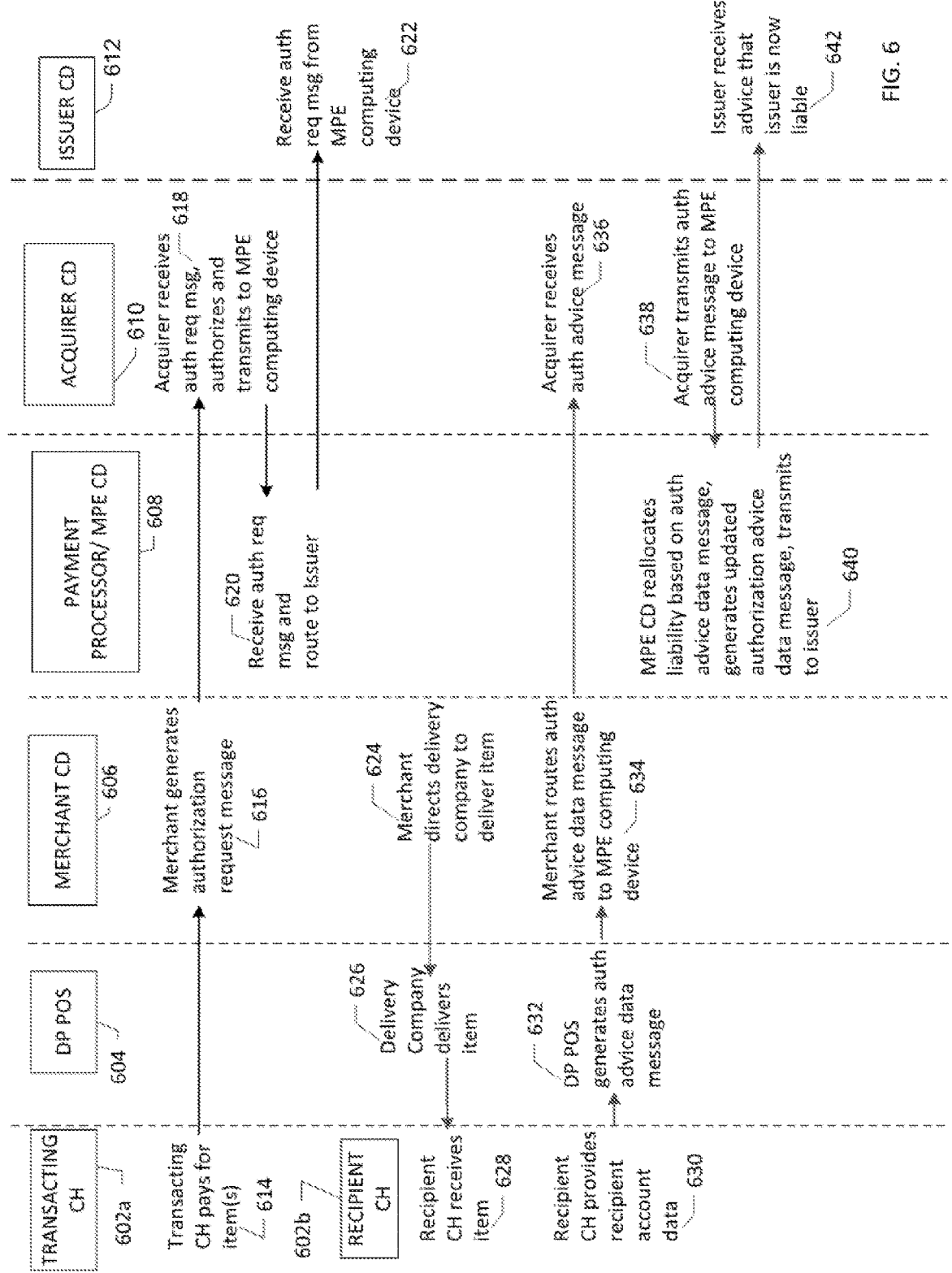

FIG. 6 shows an example message flow by which the MPE computing device (shown in FIG. 2) reallocates liability for a transaction. As shown in FIG. 6, a number of electronic messages are transmitted across various computing devices, including a transacting accountholder computing device 602a, a delivery party point of delivery (POD) computing device 604, a merchant computing device 606, an acquirer computing device 610, and an issuer computing device 612. Also included in the message flow is a payment processor computer system that includes a message protocol extension (MPE) computing device 608 (similar to MPE computing device 150 as described in FIGS. 1, 2, and 3). In one embodiment, messages are received and transmitted directly by MPE computing device 608 to other computing devices. In another embodiment, MPE computing device 608 receives and transmits message via another computing device (e.g., server system 112 as described with respect to FIGS. 2 and 3) that is part of a payment processor computer system.

A transacting accountholder (i.e., one who initiates the transaction) initiates 614 a transaction using accountholder computing device 602a. In a related embodiment, the transacting accountholder uses a physical payment card to initiate the transaction (e.g., by using the payment card at a merchant location). In either embodiment described above, account data for the transacting accountholder is transmitted to a merchant computing device 606. At 616, a merchant computing device 606 uses the account data and transaction data (e.g., transaction date/time, transaction amount, or the like) to generate an authorization request message. Merchant computing device 606 transmits the authorization request message to acquirer computing device 610, which receives it at 618.

Acquirer computing device 610 requests authorization from an issuer computing device 612, as described in greater detail with respect to FIG. 1. As shown in FIG. 6, acquirer computing device 610 transmits 618 the authorization request message to a payment processor computer system that includes MPE computing device 608. The payment processor computer system receives 620 the authorization request message and routes it to issuer computing device 612. Issuer computing device 612 receives 622 the authorization request message and authorizes the transaction after checking whether the account of transacting accountholder 602a contains sufficient funds for the transaction. Issuer computing device 612 returns confirmation of the authorization to the payment processor computer system (not shown).

Once the transaction is authorized, the merchant (via merchant computing device 606, for example) directs 624 the delivery party to deliver the item. The delivery company delivers 626 the item. Additionally, the delivery company employee delivering the item will also be equipped with POD computing device 604. At the point of delivery, the delivery company employee will present POD computing device 604 to the delivery recipient 602b. The recipient may be the same individual/entity as the transacting accountholder or may be another individual/entity. Recipient 602b receives 628 the item and provides 630 recipient account data. In one embodiment, recipient 602b provides the recipient account data via a recipient computing device (e.g., a mobile computing device). In another embodiment, recipient 602b provides the recipient account data using a physical payment card (e.g., by swiping it with POD computing device 604).

Upon provision of the recipient account data, POD computing device 604 generates 632 an authorization advice data message that includes the recipient account data and is denoted with a message identifier indicating that it is an authorization advice data message (e.g., message identifier 0120). POD computing device 604 transmits the authorization advice data message to merchant computing device 606. Merchant computing device 606 in turn routes it 634 to acquirer computing device 610. Acquirer computing device 610 receives the authorization advice data message and transmits it 638 to MPE computing device 608.

MPE computing device 608 is configured to receive the authorization advice data message and reallocate 640 liability based on it. More specifically, MPE computing device 608 filters out the recipient account data and further extracts an issuer identifier associated with an issuer for the recipient's account. Again, recipient 602*b* may be the same entity as transacting accountholder 602*a*, so that the issuer is the same as the issuer for the account initially used in initiating the transaction. Similarly, if the recipient is a different entity that the transacting accountholder, the issuer may be a different issuer than that of the transacting accountholder's account. Or the issuer may be the same issuer, such as where the recipient and transacting accountholder are different entities but both have accounts at the same issuer.

Based on the determined issuer, MPE computing device 608 reallocates liability for the transaction. In other words, receipt of the authorization advice data message signals to MPE computing device 608 that a recipient provided recipient account data at delivery, effectively transferring liability away from the merchant and to the recipient's issuer. As described earlier, a merchant may be the default liable party for any transaction. Accordingly, existing transaction data may include a merchant identifier being stored in conjunction with a liable party data record or liable party variable for the transaction. In one embodiment, MPE computing device 608 may affirmatively assign liability to the merchant at 620 when MPE computing device 608 first receives transaction data for the transaction. In another embodiment, transaction data that MPE computing device 608 receives from acquirer computing device 610 already includes a merchant identifier representing the merchant to be the liable party for the transaction.

MPE computing device 608 is configured to replace a merchant identifier with the issuer identifier in a liable party data record stored within the memory device. MPE computing device 608 is also configured to generate an updated authorization advice data message using the issuer identifier received in the original authorization advice data message. In one embodiment, MPE computing device 608 inserts, into the authorization advice data message, an additional field that is a liability update flag that indicates message protocol extension to the issuer. In another embodiment, MPE computing device 608 updates the liability record included within the original authorization advice data message to show that the issuer is now liable, not the merchant. MPE computing device 608 transmits the updated authorization advice data message to issuer computing device 612, thereby completing message protocol extension for the item from the merchant to the issuer. Issuer computing device 612 receives the updated authorization advice data message and thus receives notice that the recipient's issuer is now liable for the transaction.

Figure 7:
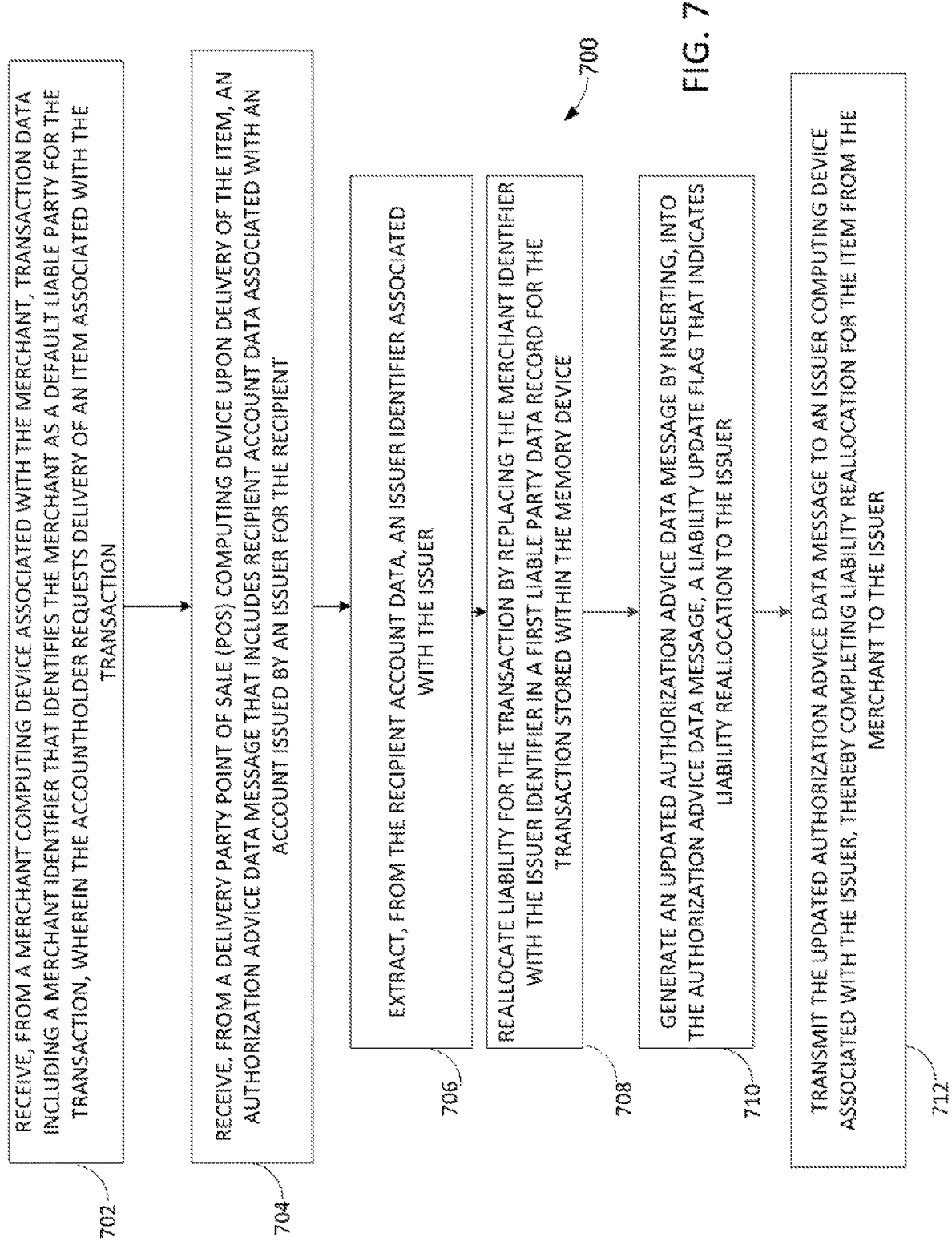

FIG. 7 is an example flow diagram illustrating a method flow by which the MPE computing device reallocates liability for a transaction. In the example embodiment, the MPE computing device receives transaction data from a merchant computing device associated with a merchant. The transaction data includes a merchant identifier that identifies the merchant as a default liable party for the transaction. Additionally, the transaction is for an item that is to be delivered to a delivery location (e.g., one chosen by the accountholder). Accordingly, the accountholder requests delivery of the item at time of the transaction.

Subsequently, the merchant directs a delivery party (e.g., a courier service) to deliver the item to the delivery location, and the delivery party proceeds. On delivery, the delivery party will prompt a recipient of the delivery to provide recipient account data, using a delivery party point of delivery (POD) computing device. When the recipient does so, the POD computing device transmits an authorization advice data message to the MPE computing device bearing the recipient account data. Additionally, the recipient account data includes an issuer identifier for the issuer that issued the recipient's account. The MPE computing device receives the authorization advice data message. The MPE computing device extracts, from the recipient account data, the issuer identifier.

The MPE computing device then reallocates liability for the transaction by replacing the merchant identifier with the issuer identifier in a liable party data record for the transaction stored within a memory device. More specifically, the MPE computing device stores the merchant identifier as a default liable party in a liable party data record or data field associated with the transaction when the MPE computing device receives the initial transaction data. Therefore, when the authorization advice data message is received, the MPE computing device is configured to replace the stored merchant identifier with the issuer identifier extracted from within the recipient's account data.

The MPE computing device then generates an updated authorization advice data message by inserting, into the authorization advice data message, a liability update flag that indicates message protocol extension to the issuer. In one embodiment, the liability update flag is just the updated liable party data record, showing that the issuer is now liable. In another embodiment, the liability update flag is in one of multiple states, with each state indicating a different liability status. For example, the liability update flag may be in one of a "default" and an "updated" state, or the like. The MPE computing device 608 transmits the updated authorization advice data message to an issuer computing device associated with the issuer, thereby completing message protocol extension for the item from the merchant to the issuer.

Figure 8:
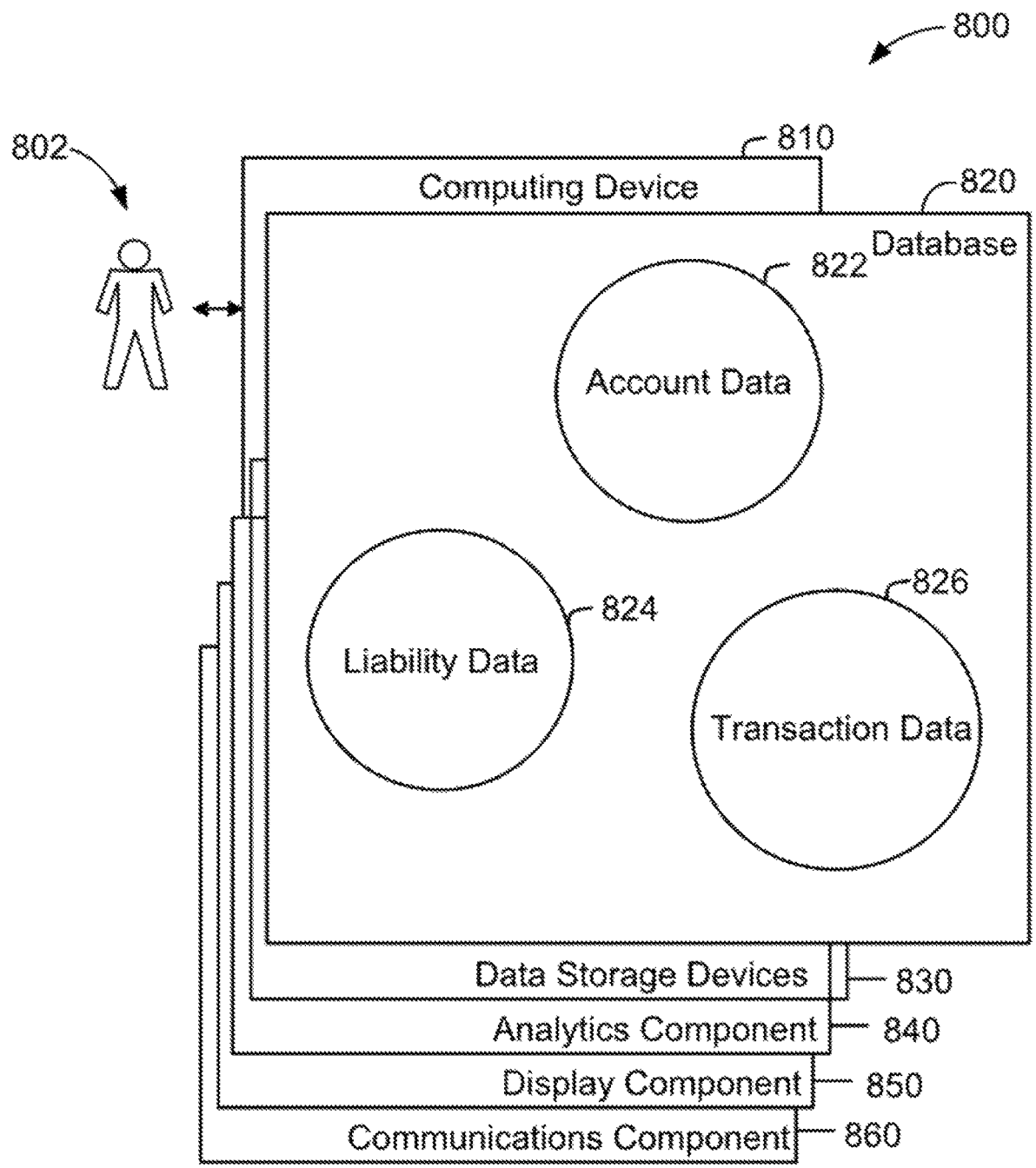

FIG. 8 shows an example configuration of a database 800 within a computing device, along with other related computing components, that may be used to reallocate liability for a transaction. In some embodiments, computing device 810 is similar to server system 112 (shown in FIG. 2). User 802 (such as a user operating server system 112) may access computing device 810 in order to reallocate liability for a transaction. In some embodiments, database 820 is similar to database 120 (shown in FIG. 2). In the example embodiment, database 820 includes account data 822, accountholder data 824, and transaction data 826. Account data 822 includes accountholder personal data (e.g., location, telephone number, account numbers), issuer data, account details, expiration data, or the like.

Liability data 824 includes liability data records, liability update flags, current liable party data (e.g., merchant identifiers and/or issuer identifiers), partial liability data, or the like. Transaction data 826 includes transaction amounts, transaction dates/times, account data related to the payment card used to perform the transaction (e.g., primary account number (PAN) associated with payment card, card expiration date, card issuer, card security code, or the like), merchant identifiers, stock-keeping unit (SKU) data relating to the goods or services purchased by the accountholder, or the like.

Computing device 810 also includes data storage devices 830. Computing device 810 also includes analytics component 840 that processes message protocol extension requests. Computing device 810 also includes display component 850 that receives processed message protocol extension data from analytics component 840 and converts it into various formats in order to provide account data in a format compatible with various different user computing devices.

Computing device 810 also includes communications component 860 which is used to communicate with accountholder computing devices, issuer computing devices, and merchant computing devices, using predefined network protocols such as TCP/IP (Transmission Control Protocol/Internet Protocol) over the Internet.

As will be appreciated based on the foregoing specification, the above-described embodiments of the disclosure may be implemented using computer programming or engineering techniques including computer software, firmware, hardware or any combination or subset thereof, wherein the technical effect is to reallocate liability for a transaction. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of electronic user message protocol extension for a transaction of an accountholder with a merchant, the method implemented using a message protocol extension (MPE) computing device in communication with a memory device, the method comprising:

receiving, from a merchant computing device associated with the merchant, transaction data including a merchant identifier that identifies the merchant as a default liable party for the transaction, wherein the accountholder requests delivery of an item associated with the transaction;

receiving, from a delivery party point of delivery (POD) computing device upon delivery of the item, an authorization advice data message that includes recipient account data associated with an account issued by an issuer for the recipient, wherein the authorization advice data message is received after the transaction is authorized by the issuer;

extracting, from the recipient account data, an issuer identifier associated with the issuer;

reallocating, in response to the received authorization advice data message, liability for the transaction from the merchant to the issuer by replacing the merchant identifier with the issuer identifier in a first liable party data record for the transaction stored within the memory device;

generating an updated authorization advice data message by inserting, into the authorization advice data message, a liability update flag that indicates message protocol extension to the issuer; and transmitting the updated authorization advice data message to an issuer computing device associated with the issuer, thereby completing message protocol extension for the item from the merchant to the issuer.

2. A method in accordance with claim 1, wherein the recipient provides recipient account data by at least one of an interaction of a physical payment card with the POD computing device and an interaction of a recipient computing device with the POD computing device.

3. A method in accordance with claim 1, further comprising:

determining that one or more additional items remain undelivered, the one or more additional items corresponding to the transaction;

generating a second liable party data record in the memory device; and allocating partial liability for the transaction to each of the merchant and the issuer, including storing the issuer identifier in association with the first liable party data record and storing the merchant identifier in association with the second liable party data record.

4. A method in accordance with claim 1, further comprising reallocating liability for the transaction based on one or more predefined liability rules.

5. A method in accordance with claim 1, further comprising configuring the POD computing device to generate the authorization advice data message.

6. A method in accordance with claim 1, wherein the POD computing device is associated with a delivery service merchant, and wherein the delivery service merchant delivers the item associated with the transaction.

7. A method in accordance with claim 1, further comprising transmitting the updated authorization advice data message to an acquirer computing device associated with an acquirer that holds a merchant account for the merchant, indicating the reallocation of liability from the merchant to the issuer.

8. A system for electronic user message protocol extension for a transaction of an accountholder with a merchant, the system comprising:

a memory device configured to store account data; and a message protocol extension (MPE) computing device in communication with the memory device, the MPE computing device further configured to:

receive, from a merchant computing device associated with the merchant, transaction data including a merchant identifier that identifies the merchant as a default liable party for the transaction, wherein the accountholder requests delivery of an item associated with the transaction;
receive, from a delivery party point of delivery (POD) computing device upon delivery of the item, an authorization advice data message that includes recipient account data associated with an account issued by an issuer for the recipient, wherein the authorization advice data message is received after the transaction is authorized by the issuer;
extract, from the recipient account data, an issuer identifier associated with the issuer;
reallocate, in response to the received authorization advice data message, liability for the transaction from the merchant to the issuer by replacing the merchant identifier with the issuer identifier in a first liable party data record for the transaction stored within the memory device;
generate an updated authorization advice data message by inserting, into the authorization advice data message, a liability update flag that indicates message protocol extension to the issuer; and
transmit the updated authorization advice data message to an issuer computing device associated with the issuer, thereby completing message protocol extension for the item from the merchant to the issuer.

9. A system in accordance with claim 8, wherein the recipient provides recipient account data by at least one of an interaction of a physical payment card with the POD computing device and an interaction of a recipient computing device with the POD computing device.

10. A system in accordance with claim 8, wherein the MPE computing device is further configured to:
determine that one or more additional items remain undelivered, the one or more additional items corresponding to the transaction;
generate a second liable party data record in the memory device; and
allocate partial liability for the transaction to each of the merchant and the issuer, including storing the issuer identifier in association with the first liable party data record and storing the merchant identifier in association with the second liable party data record.

11. A system in accordance with claim 8, wherein the MPE computing device is further configured to reallocate liability for the transaction based on one or more predefined liability rules.

12. A system in accordance with claim 8, wherein the MPE computing device is further configured to configure the POD computing device to generate the authorization advice data message.

13. A system in accordance with claim 8, wherein the POD computing device is associated with a delivery service merchant, and wherein the delivery service merchant delivers the item associated with the first transaction.

14. A system in accordance with claim 8, wherein the MPE computing device is further configured to transmit the updated authorization advice data message to an acquirer computing device associated with an acquirer that holds a merchant account for the merchant, indicating the reallocation of liability from the merchant to the issuer.

15. A non-transitory computer readable medium that includes computer executable instructions for electronic user message protocol extension for a transaction of an accountholder with a merchant, wherein when executed by a message protocol extension (MPE) computing device comprising a processor in communication with a memory device, the computer executable instructions cause the MPE computing device to:
receive, from a merchant computing device associated with the merchant, transaction data including a merchant identifier that identifies the merchant as a default liable party for the transaction, wherein the accountholder requests delivery of an item associated with the transaction;
receive, from a delivery party point of delivery (POD) computing device upon delivery of the item, an authorization advice data message that includes recipient account data associated with an account issued by an issuer for the recipient, wherein the authorization advice data message is received after the transaction is authorized by the issuer;
extract, from the recipient account data, an issuer identifier associated with the issuer;
reallocate, in response to the received authorization advice data message, liability for the transaction from the merchant to the issuer by replacing the merchant identifier with the issuer identifier in a first liable party data record for the transaction stored within the memory device;
generate an updated authorization advice data message by inserting, into the authorization advice data message, a liability update flag that indicates message protocol extension to the issuer; and
transmit the updated authorization advice data message to an issuer computing device associated with the issuer, thereby completing message protocol extension for the item from the merchant to the issuer.

16. A non-transitory computer readable medium in accordance with claim 15, wherein the computer executable instructions cause the MPE computing device to:
determine that one or more additional items remain undelivered, the one or more additional items corresponding to the transaction;
generate a second liable party data record in the memory device; and
allocate partial liability for the transaction to each of the merchant and the issuer, including storing the issuer identifier in association with the first liable party data record and storing the merchant identifier in association with the second liable party data record.

17. A non-transitory computer readable medium in accordance with claim 15, wherein the computer-executable instructions cause the MPE computing device to reallocate liability for the transaction based on one or more predefined liability rules.

18. A non-transitory computer readable medium in accordance with claim 15, wherein the computer-executable instructions cause the MPE computing device to configure the POD computing device to generate the authorization advice data message.

19. A non-transitory computer readable medium in accordance with claim 15, wherein the POD computing device is associated with a delivery service merchant, and wherein the delivery service merchant delivers the item associated with the transaction.

20. A non-transitory computer readable medium in accordance with claim 15, wherein the computer-executable instructions cause the MPE computing device to transmit the updated authorization advice data message to an acquirer computing device associated with an acquirer that holds a merchant account for the merchant, indicating the reallocation of liability from the merchant to the issuer.

* * * * *

UNITED STATES PATENT AND TRADEMARK OFFICE
CERTIFICATE OF CORRECTION

PATENT NO.         : 10,482,468 B2                                     Page 1 of 1
APPLICATION NO.    : 15/349129
DATED              : November 19, 2019
INVENTOR(S)        : Ahmed Hosny et al.

It is certified that error appears in the above-identified patent and that said Letters Patent is hereby corrected as shown below:

In the Claims

In Claim 13, Column 21, Line 56, delete "with the first transaction" and insert therefor -- with the transaction --.

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*